United States Patent Office 2,805,957
Patented Sept. 10, 1957

2,805,957

PHTHALOCYANINE PIGMENTS

Felix Frederick Ehrich, Westfield, N. J., assignor to E. I. du Pont de Nemours and Company, Wilmington, Del., a corporation of Delaware No Drawing. Application November 12, 1953, Serial No. 391,730

4 Claims. (Cl. 106—288)

This invention relates to new phthalocyanine pigments, processes for preparing them and coating compositions containing the same. More particularly, it relates to the production of phthalocyanine pigments which are resistant to flocculation when dispersed in an organic coating composition.

Phthalocyanine pigments are well known for their outstanding tinctorial strength and resistance to light and chemical agents. Such pigments are also known to have a serious defect commonly referred to as flocculation, a characteristic evidenced by an apparent aggregation of pigment particles during setting and drying of organic coating compositions containing the same, resulting in marked reduction of color strength. What actually happens in the paint film and whether the word "flocculation" is correctly used to describe it are subjects which have been disputed. The important point, however, is that the enamel, paint or lacquer when standing in a quiescent state exhibits a different color than when it is being vigorously agitated and, therefore, can not be depended upon to give reproducible color in actual use under a variety of conditions of application.

The reversibility of the phenomenon may moreover, be used as a test for "flocculation." One may, for instance, make a typical enamel containing about 10 parts of phthalocyanine and 90 parts of TiO₂ dispersed in an oil-modified alkyd resin and this enamel may be applied to a test panel by spraying in the conventional manner. When the film has become tacky, usually in three to five minutes, a portion of the panel is rubbed with a soft cloth or with the finger. A difference in color of the rubbed portion as compared to the undisturbed film is considered evidence of flocculation. With untreated prior art phthalocyanines this rubbed portion of the film appears darker or stronger than the unrubbed portion. This test might be considered typical of the behavior of a brushing enamel which shows serious brush marks when a partially dried portion is brushed over as in joining with a previously brushed portion.

Another test more particularly applicable to compositions which dry very rapidly and largely by evaporation of the solvent, such as a typical nitrocellulose lacquer, but also applicable to enamels, especially those formulated for application by dipping, involves spraying a test panel and allowing it to dry, after which a portion of the same composition which has been standing undisturbed is poured over the test panel and allowed to drain freely. Again, a difference in color is evidence of "flocculation" and with the typical prior art phthalocyanine the poured portion appears light or weak vs. the sprayed portion. This test illustrates the problem encountered in attempting to match the color of a dipped auto fender, for instance, with that of the sprayed auto body.

Numerous attempts have been made to eliminate the defect of flocculation of phthalocyanine pigments, for example, the addition of aluminum benzoate, or phthalocyanine monosulfonic acid to the phthalocyanine pigments subject to flocculation.

It is well known that pure copper phthalocyanine pigments exhibit a pronounced tendency to grow crystals in many hydrocarbon solvents, particularly those of an aromatic nature, with consequent loss of tinctorial strength. To obviate this defect, it is also well known to introduce small amounts of chlorine, usually about 3–5%, which is appreciably less than one atom of chlorine per molecule of phthalocyanine. Such chlorine-containing pigments are not significantly altered in shade and are substantially free from the tendency to grow crystals in solvents. Chlorine is also sometimes introduced in larger amounts to alter the hue toward green. Throughout the specification and claims, reference to copper phthalocyanine is intended to include chlorine-containing copper phthalocyanine.

It is an object of this invention to produce phthalocyanine pigments which are highly resistant to flocculation in organic vehicle coating compositions. It is another object of this invention to provide an improved process for the production of phthalocyanine pigments. It is still another object of the invention to produce improved coating compositions containing these new and improved phthalocyanine pigments. Other objects of the invention will appear hereinafter.

The objects of this invention are attained by preparing new phthalocyanine pigments comprising mixtures of a major amount of a phthalocyanine pigment subject to flocculation with a minor amount of substituted phthalocyanine in which the substituent is from the class consisting of carboxyl (COOH), carbonamide (CONH₂), and phosphonous acid (P(OH)₂), under such conditions that not exceeding about 15% of the molecules of phthalocyanine can contain the substituent group.

The new mixed pigments of this invention are highly resistant to flocculation in organic coating compositions; they exhibit the tinctorial properties of unmodified phthalocyanine pigments with a very minor effect from the addition of the polar group; and they exhibit the excellent light-fastness and resistance to chemical attack characteristic of phthalocyanine pigments.

The following examples illustrate, in detail, several processes for the production of the new pigments and coating compositions of this invention.

Example 1

The following ingredients are charged to a well agitated reactor equipped for external heating and fitted with an air-cooled reflux condenser:

122 grams phthalic anhydride
33 grams 4-chlorophthalic acid
3.0 grams trimellitic acid
44 grams cupric chloride dihydrate
222 grams urea
0.3 gram ammonium molybdate
800 ml. deodorized kerosene The mixture is heated with good agitation to 195° C. in about two and one-half hours and held at 195°–200° C. for about four hours. It is then cooled to about 150° C. and 90 ml. of 98% sulfuric acid is added dropwise. The resulting green phthalocyanine sulfate is separated from most of the kerosene by filtration and then hydrolyzed by introducing into about 4000 ml. of water containing 200 grams of NaOH. It is heated to the boil, filtered hot, washed free of soluble salts and dried at about 150° C. to remove water and any residual kerosene.

The resulting dry pigment may be further conditioned for use by the milling process of Lane and Stratton U. S. Patent No. 2,556,727. For instance, 65 grams of the crude pigment and 500 ml. of acetone may be charged to a ball mill of about ⅔ gallon capacity containing 4800 grams of steel shot and the mill rotated for about three days. After separation from the grinding balls, the acetone is removed by steam distillation, and the resulting aqueous pigment slurry is further purified by heating under acid conditions followed by filtration, washing free of soluble salts and drying. The resulting blue pigment has excellent tinctorial properties and exhibits a marked resistance to flocculation when dispersed in a coating composition.

The process described above would suggest that about 10% of the molecules in the final product would contain a free carboxyl group on one benzene ring and this should result in some solubility in alkaline solutions. However, no such solubility is observed.

On the other hand, free carboxyl groups in the presence of the excess ammonia and urea and the high temperatures of this reaction are frequently converted to the amide so the product may well contain the carbonamide (—CO—NH$_2$) group instead of free carboxylic acid. There is no clear evidence which group may be present but it is contemplated that either group or a mixture is operative for this invention.

In this example one may substitute 3.2 grams of pyromellitic acid or 4.3 grams of mellitic acid for the trimellitic acid used, with comparable results. Although these products show very good resistance to flocculation, the additional water solubilizing groups may introduce other undesirable properties.

*Example II*

The following ingredients are charged to the reactor of Example I.

121 grams phthalic anhydride
32 grams 4-chlorophthalic acid
7.2 grams 4-phosphono phthalic acid

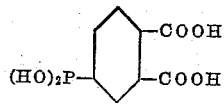

44 grams cupric chloride-dihydrate
222 grams urea
0.3 gram ammonium molybdate
800 ml. deodorized kerosene This mixture is heated and the pigment isolated following the procedure of Example I. The crude product may be further conditioned for pigment use by milling in acetone according to the methods of Lane and Stratton U. S. Patent No. 2,556,727.

*Example III*

Six hundred (600) parts of anhydrous aluminum chloride and 150 parts of sodium chloride are heated together to form a melt in a vessel equipped with a reflux condenser. At about 120° C., 50 parts of copper phthalocyanine are introduced, and then, while keeping the mass at reflux temperature, 20 parts of phosphorus trichloride are introduced over a period of thirty minutes. The melt is held at about 120° C. for about fifteen minutes and then drowned into ice water and HCl. The blue dye is filtered off, washed free of soluble acid and dried to give a blue powder which may be further conditioned by milling in acetone to give a high strength, flocculation-resistant copper phthalocyanine pigment.

In Examples II and III the resulting products are copper phthalocyanine pigments in which the substituent group —P(OH)$_2$ is present on at least one benzene ring in about 10% of the molecules of copper phthalocyanine.

It is contemplated that the pigment mixtures may be made in any convenient manner. In many cases it will be convenient and preferred to use a small amount of the appropriately substituted phthalic anhydride derivative in co-synthesis with phthalic anhydride in a conventional phthalic anhydride-urea synthesis of phthalocyanine. When the mixed pigment of the invention is made by the co-synthesis from phthalic anhydride and the substituted phthalic anhydride, the latter is preferably present in an amount of between 0.5 to 3.75 mol percent to 99.5 to 96.25 mol percent of the former whereby to produce a mixed product containing between 2 and 15 mol percent substituted phthalocyanine and 85 to 98 mol percent of phthalocyanine normally subject to flocculation. In other cases, it may be preferred to prepare the derivative by direct and controlled reaction of a phthalocyanine with an appropriate reagent such as PCl$_3$ followed by hydrolysis. It is contemplated that mixtures of separately prepared phthalocyanines, containing up to one or more substituent groups per molecule, with unsubstituted phthalocyanines should be included in this invention. When the separately prepared phthalocyanines are subsequently mixed, they are preferably mixed in proportions between 2 and 15 mol percent of the substituted phthalocyanine to 85–98% of the nonflocculation resistant phthalocyanine.

Another class of phthalocyanines containing polar groups comprises those metal phthalocyanines in which the central metal atom has a valence more than 2 (such as aluminum, iron, titanium, etc.) wherein the extra valences are satisfied by polar ionic groups, usually —OH or —Cl. Mixtures of small amounts of such polyvalent metal phthalocyanines with copper phthalocyanines also are effective in controlling flocculation, but have been less desirable for use because of difficulty in synthesis and because of less desirable tinctorial properties than is found with the substituted copper phthalocyanines.

The amount of substituted phthalocyanine which is present in the final pigment of the present invention profoundly influences its behavior in accomplishing the objectives of this invention. When such species are present in amounts below about 2 mol percent, the effect is so small as to be hardly noticeable and the pigments do not show an acceptable resistance to "flocculation" in any vehicle. As the amount of the substituted species increases, the effect becomes more pronounced and, in the range between about 5 mol percent and 10 mol percent, a definite optimum is reached which may vary somewhat for different vehicle systems. The use of amounts over about 15 mol percent is generally considered uneconomical. Moreover, we have been quite surpised to discover that coating compositions made from such products containing over about 10 mol percent of the substituted species exhibit an effect substantially the reverse of the usual "flocculation" in that the quiescent enamel is actually stronger than the same enamel after vigorous agitation. Such a phenomenon may be called "flooding" in contrast to the more common "flocculation." Regardless of the nomenclature the two phenomena appear, however, to be closely related in that both are probably a result of a separation, in some manner, of the two pigments in a paint system comprising a mixture of phthalocyanine and a second prime pigment, such as TiO$_2$, dispersed together in a vehicle, and from the standpoint of the practical application, they are equally objectionable. It is well known that the tendency of a phthalocyanine pigment to "flocculate" varies markedly with the vehicles used as well as with the solvents in these vehicles and it is possible to exercise limited control over this property by the proper selection of vehicles and thinners, and by the use of "anti-flooding" agents and the like. Such means of control, however, are only moderately effective and, moreover, restrict the choice of vehicles. Now, we find that by means of the proper balance of pigments which show a tendency to "flood" with pigments which flocculate, it is possible to obtain in a chosen vehicle a composition which shows no color change on vigorous agitation.

Hence, the ability to make a pigment which shows some tendency to "flood" as defined herein is actually an advantage in the over-all control of "flocculation," and we contemplate this invention as including the range of compositions containing from about 2 mol percent to about 15 mol percent of the substituted species. This does not mean that pigments containing more than 15 mol percent of the substituted species would lack utility because they can be formulated into satisfactory products using the technique of balancing properties of pigments noted above. Nevertheless, it is the objective of this invention to make products showing the least possible flocculation and such products containing more than 15 mol percent of substituted phthalocyanine do not meet this objective.

Direct phosphonylation of the CPC is easily controlled and is a good procedure but co-synthesis is preferred when a phosphonylated phthalic acid is available.

The conditions of synthesis such as temperature, rate of heating, amount of urea, amount of catalyst, and the like, are not different from the conventional commercial manufacture of copper phthalocyanine. The examples have shown the synthesis conducted in the presence of a deodorized kerosene as the liquid diluent. However, when deodorized kerosene or other high-boiling hydrocarbons are used for this purpose, it is essential that they be substantially free from oxidation products, such as peroxides, which may result from prolonged exposure of the hydrocarbons to the atmosphere, since such impurities frequently function in some unexplained manner to inhibit the formation of phthalocyanines in this reaction. Moreover, other diluents previously used for this purpose can be used as, for instance, trichlorbenzene, orthodichlorbenzene, nitrobenzene, and the like. In fact, the liquid diluent may be omitted altogether since its presence does not seem to affect the course of the phthalocyanine synthesis in any major way beyond maintaining the material in suspension and preventing the severe caking usually found in the absence of such diluents and in functioning as an efficient heat transfer medium.

The products may be separated from the liquid diluent in a variety of ways. For instance, the major portion may be removed by filtration and the remainder removed by steam distillation. As an alternative, the methods proposed by Barnhard in U. S. Patent No. 2,602,800 may be used, separating the phthalocyanine as a sulfate from the major portion of the kerosene or trichlorbenzene followed by hydrolysis of the sulfate and removal of the remainder of the solvent in the drier.

In common with other phthalocyanine pigments, the products of the synthesis methods described in this invention generally exhibit a relatively large particle size and require conditioning by reduction of the particle size for most uses. In the examples, the milling method of Lane and Stratton U. S. Patent No. 2,556,727 has been shown as the preferred method for this conditioning. However, excellent pigment strength can be obtained by the conventional acid pasting method (solution in concentrated sulfuric acid followed by dilution with water to precipitate the finely-divided pigment) or by the salt milling methods of Detrick and Lang U. S. Patent No. 2,402,167.

The invention has been shown as applied to a partially chlorinated copper phthalocyanine as the preferred species since the principal application is in coating compositions wherein the usual solvents frequently cause crystal growth and consequent loss of tinctorial values with the chlorine-free species. A preferred range of reacting proportions for the chlorinated species is 82.75 to 77.5 mol percent of phthalic anhydride, 16 to 20 mol percent of 4-chlorophthalic acid and 1.25 to 2.5 mol percent of a substituted phthalic anhydride in which the substituent is from the class consisting of carboxyl (COOH), carbonamide (CONH$_2$), and phosphonous acid (P(OH)$_2$). Preferred pigment compositions containing chlorinated copper phthalocyanines comprise a mixture of 60–70 mol percent of monochloro copper phthalocyanine, 20 to 30 mol percent copper phthalocyanine, and 15 to 2 mol percent of a substituted phthalocyanine in which the substituent is from the class consisting of carboxyl (COOH), carbonamide (CONH$_2$), and phosphonous acid (P(OH)$_2$). However, it is contemplated that the invention is equally applicable to such chlorine-free species and also to the more highly chlorinated species wherein the chlorine has been introduced to alter the shade toward the green. Furthermore, it is not intended to limit the invention to copper phthalocyanine for it is contemplated as equally applicable to phthalocyanines containing other metals such as nickel, cobalt, iron, aluminum, etc., as well as to the metal-free species.

The reasons why the pigments of this invention are superior to the prior art pigments in resistance to flocculation are not fully understood. Many of the properties of a paint, enamel, lacquer of similar system can be explained on the assumption that such a system of finely-divided solid suspended in a vehicle is a lyophilic colloidal sol. The stability of such a sol may be related to the charge on the particles of the dispersed phase, and it is suggested that the introduction of polar groups into the phthalocyanine molecule increases this charge and promotes stability in the system. It is still not understood why the maximum stability is found in the presence of only a limited amount of polar molecules.

The products of this invention are valuable in all uses to which phthalocyanine pigments are commonly put. However, they are especially valuable in the pigmentation of paints and enamels where the behavior of the previously-known phthalocyanines has been especially deficient.

Throughout the specification and claims, any reference to parts, proportions and percentages refers to parts, proportions and percentages by weight unless otherwise specified.

Since it is obvious that many cahnges and modifications can be made in the above-described details without departing from the nature and spirit of the invention, it is to be understood that the invention is not to be limited to said details except as set forth in the appended claims.

I claim:

1. A copper phthalocyanine pigment highly resistant to flocculation in an organic coating vehicle comprising a mixture of 85 to 98 mol percent of a copper phthalocyanine pigment subject to said flocculation and 15 to 2 mol percent of a substituted copper phthalocyanine in which the substituent is from the class consisting of carboxyl (COOH), carbonamide (CONH$_2$), and phosphonous acid (P(OH)$_2$).

2. A copper phthalocyanine pigment highly resistant to flocculation in an organic coating vehicle comprising a mixture of 85 to 98 mol percent of a copper phthalocyanine pigment subject to said flocculation and 15 to 2 mol percent of a substituted copper phthalocyanine in which the substituent is phosphonous acid (P(OH)$_2$).

3. A copper phthalocyanine pigment highly resistant to flocculation in an organic coating vehicle comprising a mixture of 85 to 98 mol percent of a copper phthalocyanine pigment subject to said flocculation and 15 to 2 mol percent of a substituted copper phthalocyanine in which the substituent is carboxyl (COOH).

4. A copper phthalocyanine pigment highly resistant to flocculation in an organic coating vehicle comprising a mixture of 60 to 70 mol percent of monochloro copper phthalocyanine, 20 to 30 mol percent copper phthalocyanine, and 15 to 2 mol percent of a substituted phthalocyanine in which the substituent is from the class consisting of carboxyl (COOH), carbonamide (CONH$_2$), and phosphonous acid (P(OH)$_2$).

(References on following page)

References Cited in the file of this patent

UNITED STATES PATENTS

| | | |
|---|---|---|
| 2,242,469 | Hoyer et al. | May 20, 1941 |
| 2,285,359 | Rosch | June 2, 1942 |
| 2,613,128 | Baumann | Oct. 7, 1952 |
| 2,615,027 | Bluemmel et al. | Oct. 21, 1952 |
| 2,647,128 | Brouillard | July 28, 1953 |
| 2,647,908 | Buc | Aug. 4, 1953 |

FOREIGN PATENTS

| | | |
|---|---|---|
| 496,819 | Great Britain | Dec. 7, 1938 |

OTHER REFERENCES

Serial No. 403,866, Hoyer et al. (A. P. C.), published April 20, 1943.

Journal Soc. Dyer and Colourists, pages 70–71 (Mar. 1945).